United States Patent
Künz

(10) Patent No.: US 7,758,801 B2
(45) Date of Patent: Jul. 20, 2010

(54) PROCESS AND EXTRUSION BLOW-MOULDING MACHINE FOR PRODUCING PLASTIC CONTAINERS

(75) Inventor: Johann Künz, Hard (AT)

(73) Assignee: Alpla Werke Alwin Lehner GmbH & Co. KG, Hard (AT)

( * ) Notice: Subject to any disclaimer, the term of this patent is extended or adjusted under 35 U.S.C. 154(b) by 492 days.

(21) Appl. No.: 11/630,402

(22) PCT Filed: Jun. 15, 2005

(86) PCT No.: PCT/EP2005/006430

§ 371 (c)(1), (2), (4) Date: Nov. 13, 2007

(87) PCT Pub. No.: WO2006/000329

PCT Pub. Date: Jan. 5, 2006

(65) Prior Publication Data

US 2008/0128959 A1 Jun. 5, 2008

(30) Foreign Application Priority Data

Jun. 28, 2004 (CH) ..................................... 1086/04

(51) Int. Cl.
B29C 49/04 (2006.01)
(52) U.S. Cl. .................. 264/540; 264/530; 264/515
(58) Field of Classification Search .................. None
See application file for complete search history.

(56) References Cited

U.S. PATENT DOCUMENTS

| | | | |
|---|---|---|---|
| RE23,564 E | 10/1952 | Hobson | |
| 3,456,290 A * | 7/1969 | Ruekberg | 425/531 |
| 3,862,698 A * | 1/1975 | Hafele | 428/542.8 |
| 4,650,628 A | 3/1987 | Evely | |
| 4,696,636 A * | 9/1987 | Evely | 425/526 |
| 4,954,310 A * | 9/1990 | Andersen | 264/520 |
| 4,968,242 A * | 11/1990 | Andersen | 425/531 |
| 5,372,495 A | 12/1994 | Ogura et al. | |
| 5,705,121 A * | 1/1998 | Allred, Jr. | 264/543 |
| 6,709,261 B2 * | 3/2004 | Cargile et al. | 425/536 |

FOREIGN PATENT DOCUMENTS

EP 0 633 124 A 1/1995

* cited by examiner

*Primary Examiner*—Monica A Huson
(74) *Attorney, Agent, or Firm*—Buchanan Ingersoll & Rooney PC

(57) ABSTRACT

Process for producing plastic containers, including an extrusion blow molding machine, is disclosed. For example, in an extrusion blow molding process for plastic bottles, in which plastic tubing (T) which has been extruded from an extruder head in a definable cycle is placed in the mold cavity of a blow molding tool arrangement, the inserted plastic tubing is inflated via an infeed blow mandrel by overpressure according to the mold cavity and is then removed from the mold. The extruded plastic tubing (T) is inserted into a mold cavity which is composed of several blow mold cavities which are located axially under one another, two of the blow mold cavities at a time being arranged mirror-symmetrically to one another and connected on their mouth regions and an individual blow mold cavity being separated from the bottom section of the adjacent blow mold cavity by a land region and having a mouth on the outer surface of the blow molding tool arrangement. There is a number of guided blow mandrels corresponding to the number of pairs of blow mold cavities located mirror symmetrically to one another. The containers (B) which have been inflated according to the blow mold cavities are removed from the mold.

43 Claims, 4 Drawing Sheets

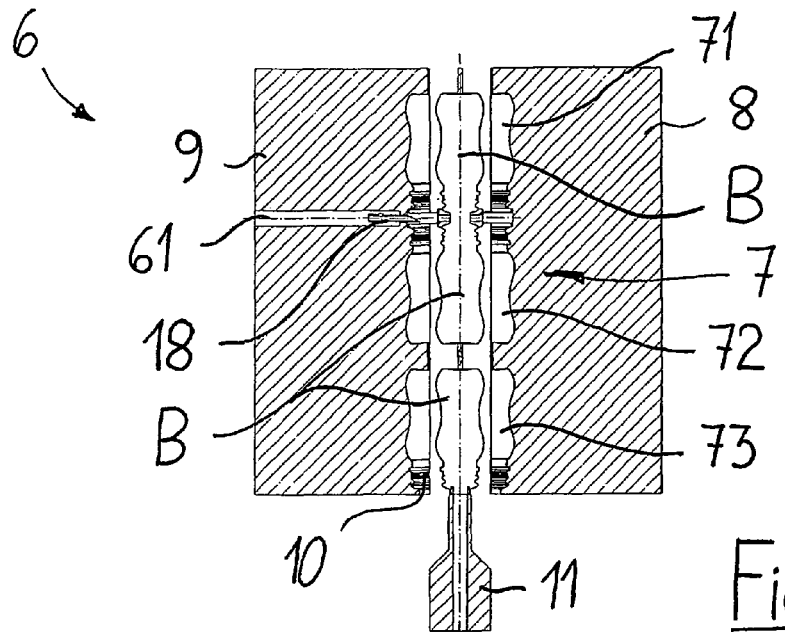
Fig. 12
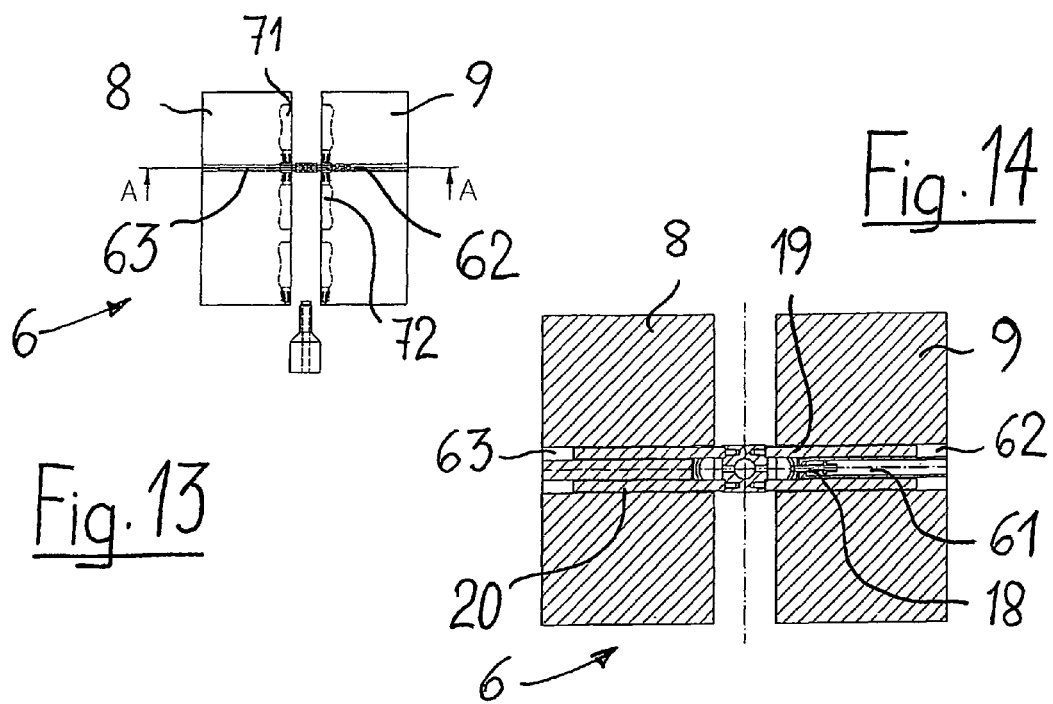
Fig. 13
Fig. 14

PROCESS AND EXTRUSION BLOW-MOULDING MACHINE FOR PRODUCING PLASTIC CONTAINERS

The invention relates to a production process and an extrusion blow molding machine for plastic containers, especially for plastic bottles, according to the preamble of the respective independent process claims and apparatus claims.

Containers conventional in the past, of white or colored sheet metal, of glass or also ceramic are being increasingly replaced by plastic containers. Mainly plastic containers are used for packaging of fluid substances, for example beverages, oil, cleaning products, cosmetics, etc. The low weight and lower costs certainly play a not inconsiderable part in this substitution. The use of recyclable plastic materials and altogether more favorable overall energy balance in their production also contribute to promoting the acceptance of plastic containers, especially plastic bottles, among consumers.

The production of plastic containers, especially plastic bottles, for example from polyethylene or polypropylene, takes place in extrusion blow molding processes, especially in an extruded tube blowing process. In this connection a plastic tube is extruded from an extruder head, placed in the blow molding tools, inflated by overpressure via a blow mandrel, and cured by cooling. The extrusion blow molding machines used for this purpose generally have at least one extruder for supplying the plastic material. The output of the extruder is connected to the extruder head, and a tube which has been extruded in one or more layers emerges on its exit nozzle which can be adjusted preferably in opening width. The extruded tube is transferred to the blow molding tool and inflated within its cavity with the blow mandrel. The plastic tube can have one or more layers, it can be extruded as a tube with visible strips, decorative strips or, relative to the periphery, with several differently colored segments.

The blowing station with the blow mandrel is conventionally located laterally from the extrusion head. The blow molding tool supplied with the extruded tube is moved into the blowing station, where then the blow mandrel is inserted into the blow mold cavity, usually from overhead. For continuous operation in the known extrusion blow molding machines there are generally two blowing stations. Each blowing station is equipped with a blow molding tool. The blowing stations are located opposite one another on either side of the extruder and have blow molding tables with the blow molding tools which are moved in alternation to under the extruder head in order to receive the extruded tube. In doing so the blow molding tool is opened to collect the tube. After closing of the blow molding tool the tube is detached between the extrusion head and the blow molding tool. Afterwards the blow molding table is moved again into the blowing station where the blow mandrel is inserted into the cavity of the blow molding tool and the tube is inflated according to the blow mold cavity and afterwards removed. For multiple extrusion heads and multiple blow molding tools each blowing station is equipped with a corresponding number of blow mandrels which are inserted jointly into the blow mold cavities. Overall the extruder with the extruder head and the two blowing stations form roughly the shape of a T. Here the extruder with the extruder head constitutes the leg of the T, while the two blow molding tables can be moved in alternation along the short halves of the crossbar to under the extruder head.

A novel extrusion blow molding machine which was developed by the applicant calls for the extruded plastic tube to be held continuously during the entire production cycle of a container. To do this, on opposing sides of the blow molding tool arrangement there are holding means for the plastic tubing. The holding devices for the tubing are formed on the one hand by the blow mandrel and on the other by the extruder head. On the side of the blow molding tool arrangement facing away from the extruder head there is a cutting means. The blow molding tool arrangement is located between the extruder head and the blow mandrel. The blow mold cavity has a mouth on the side of the blow molding arrangement facing away from the extrusion nozzle, in which the blow mandrel can be inserted into the blow mold cavity. Faulty positioning is prevented by the permanent guidance of the plastic tubing. If necessary, due to the permanent guidance of the plastic tubing, its position can be changed specifically relative to the extrusion direction. In this way for example the requirements for more complicated container geometries can be taken into account.

Extrusion blow molding machines are known in which a number of blow molding tools are located on a rotating wheel. The wheel is roughly vertical and continuously guides the blow molding tools roughly tangentially to the plastic tubing which has been continuously extruded from the extrusion head. Shortly before reaching the extruded plastic tube, the delivered blow molding tool is opened to collect the tube. As the wheel continues to turn the blow molding tool is closed around the inserted tubing and finally it is sheared off with continued turning. The arrangement of the blow molding tools and the rpm of the wheel are chosen such that the tube is only sheared off when the following blow molding tool has closed around the next piece of tube. The tube located in the cavity of the blow molding tool as the wheel continues to turn finally travels into the blowing station where it is inflated according to the blow mold cavity via a blow mandrel which has been inserted laterally into the molding tool. Finally, the inflated hollow body is discharged from the blow molding tool by opening. The blow molding tool located on the rotating wheel is routed again to the extrusion head to pick up another extruded tube.

In wheel blowing machines it is disadvantageous that due to the large number of separate blow molding tools located on the wheel, they require a relatively high investment cost for making available the blow molding tools. The blow molding tools are generally not completely identical either. This can lead to quality differences from blow molding tool to blow molding tool for the hollow bodies produced. The use of blow molding tools with several blow mold cavities is relative difficult and expensive. The blow molding tools can only be mounted at fixed mounting sites on the wheel. They are established according to the height of the blown hollow body which can be produced at most with the machine. The mounting sites can no longer be changed once they have been fixed. This is also a result of the mechanical controls which are conventional in these machines via control cams, cam disks and the like. If containers with a short overall height are blown on the wheel blow molding machine, the smaller blow molding tools mounted on the periphery of the wheel have a greater angular distance from one another. Since the plastic tube also emerges continuously from the extrusion head, this leads to larger amounts of scrap in the regions between the two blow molding tools. The extruded plastic tubing is picked up by the blow molding tool which is moved past along a circular shape under the extrusion head. In this connection the lateral feed motion of the closing blow mold halves is superimposed on an arc motion. A wheel radius as large as possible is intended to keep this arc motion of the blow mold halves as small as possible when the plastic tubing is picked up; however it cannot be completely eliminated. The circumstance that the tube is held between two successive blow molding tools on the one hand by the extruder head and on the other by the leading blow molding tool cannot change anything in the geometrical conditions either. Under unfavorable circumstances, therefore especially for more complex container geometries, it can occur that the tube is not ideally inserted into the blow cavity and is clamped partially between adjoining regions of the closing blow mold halves. This can lead to unwanted scrap.

The number of plastic containers which can be produced per unit of time and per cycle directly influences the economic efficiency of the production process, the manufacturing costs of the individual containers, and thus the amortization of the blow molding tool and the production facility. The effect of the quantitative factor is greater, the smaller the plastic container to be produced. For this reason, extrusion blow molding systems are known in which the blow molding tool has one double cavity per extrusion nozzle. The double cavity consists of two mold cavities which are arranged axially under one another and which are connected to one another at the mouths of the containers to be inflated. A blow mandrel which can be laterally fed in the mouth area through a channel of the blow molding tool inflates two containers from one plastic tube which has been inserted into the double cavity in one cycle. While production costs per plastic container with these systems can be reduced, there is still a desire for further improvement with respect to throughput and the number of individual containers which can be produced per unit of time and per cycle. At the same time the material scrap should be kept as small as possible. In this connection the dimensions of the system and its components should not be changed.

These objects are achieved in a production process and in an extrusion blow molding machine for plastic containers, especially plastic bottles, with the process steps and features cited in the characterizing section of the respective independent claims. Preferred versions and/or developments of the invention are the subject matter of the dependent claims of the respective claim category.

In a process for producing plastic containers, especially plastic bottles, in an extrusion blow molding process, plastic tubing which has been extruded from an extruder head in a definable cycle is placed in the mold cavity of a blow molding tool arrangement, the inserted plastic tubing is inflated via an infeed blow mandrel by overpressure according to the mold cavity and is then removed from the mold. Process control as claimed in the invention is characterized in that the extruded plastic tubing is inserted into a mold cavity which is composed of several blow mold cavities located axially under one another, two of the blow mold cavities being arranged mirror-symmetrically to one another and connected on their mouth regions and an individual blow mold cavity being separated from the bottom section of the adjacent blow mold cavity by a land region and having a mouth on the outer surface of the blow molding tool arrangement, there is a number of guided blow mandrels corresponding to the number of pairs of blow mold cavities located mirror symmetrically to one another, which mandrels can be moved laterally in the holes of the blow molding tool arrangement and are each inserted into the two connected blow mold cavities in the region of the mouths which border one another, in order to inflate the sections of the extruded plastic tubing which have been inserted there according to the blow mold cavities, while another free blow mandrel is inserted axially into the mouth of the individual blow mold cavity in order to inflate the section of the plastic tubing located there, and the containers inflated according to the blow mold cavities are removed from the mold.

The process control as claimed in the invention makes it possible to produce a number of plastic containers which is much larger than in known extrusion blow molding machines per cycle, especially plastic bottles. The process combines the advantages of extrusion blow molding machines with blow mandrels which are adjusted in a guided manner within the blow molding tool arrangement, with the advantages of extrusion blow molding machines with free blow mandrels which are located outside of the blow molding tool arrangement and which are axially fed to the opening of the blow mold cavity and inserted into it. The guided blow mandrels located adjustably in the blow molding tool arrangement are inserted into the extruded tubing in the area of the mutually bordering mouths of the blow mold pairs arranged mirror symmetrically to one another. In this connection they push through the wall of the plastic tubing. The penetration region however is located in that section of the plastic tubing in which the containers are separated from one another. In this connection, the inflated containers are cut off above and below the penetration region. The cut-off section can then be recycled, for example. The modification as claimed in the invention is especially advantageous in the production of smaller containers which for example have a maximum volume of roughly 50 ml to 500 ml and a correspondingly short height. The axial arrangement of the blow mold cavities for the individual containers is selected such that the height of the blow molding tool arrangement of a given extrusion blow molding machine is not changed, but optimally used. Thus, for comparatively low additional costs for the blow molding tool in one production cycle a much large number of containers can be produced. In this way the production costs per individual container can be dramatically reduced.

One feasible version of the invention calls for the extruded plastic tube to be inserted into a mold cavity which is equipped with three blow mold cavities located axially under one another. This version can be managed relatively easily in technical terms, and at only slightly increased base cost yields a production rate for finish-blown plastic containers which is much greater than for known processes.

In one version of the process as claimed in the invention, the plastic tubing is held continuously on opposing sides of the blow molding tool arrangement during the entire production cycle, i.e. during an entire extrusion and blowing cycle. In this connection the plastic tubing is permanently guided, and misplacement can be avoided. The plastic tubing located in the blow mold cavities which are arranged axially in succession is inflated directly after feed of the blow mold cavity with the extruded plastic tubing. The plastic tubing is held during the entire extrusion and blowing cycle in a defined position and can no longer oscillate around its axis. The extruder head and the blow molding tool arrangement remain in a definable and adjustable geometrical positional relationship during the entire extrusion and blowing process, and the plastic tubing can always be optimally accepted. In this way, even for more complex geometries of the blow mold cavities the danger of unintentional sticking of the plastic tubing is reduced. The process control as claimed in the invention makes it possible if necessary to specifically change the location of the extruded plastic tubing with respect to the alignment of the blow mold cavities in order to take into account special geometrical requirements.

In one advantageous version of the process as claimed in the invention, the plastic tubing is detached only after complete inflation of the plastic container. Detachment can take place by controlled pinching or also by cutting. Preferably a blade or the like is used. This process version differs both from the blowing process with the known wheel blow molding machines in which the tubing is cut off essentially uncontrolled after acceptance by the blow molding tool as the wheel continues to turn and also from the continuous and discontinuous blowing processes with known extrusion blow molding machines in which the plastic tubing is cut in a controlled manner before the actual blowing process. The process control as claimed in the invention dictates that the axially arranged blow mandrel must be synchronized for a certain time with the motion of the extruder head and/or the extrusion or transfer rate of the plastic tubing to the blow molding tool arrangement. But this simple measure ensures that the tubing is held controlled in each phase of the production cycle. The plastic tubing is detached advantageously on the side of the blow molding tool arrangement facing away from the extruder head. In this way, before detachment, the routing of the tubing via the finish-blown hollow body located on the free blow mandrel and via the extruder head is ensured. By an arrangement of the detachment site in the immediate vicinity of the mouth of the individual blow mold cavity the scrap tubing material can always be kept as small as possible regardless of the height of the blow mold cavity.

Relative to the direction of motion of the plastic tubing the blow molding tool means is located between the extruder head and the free blow mandrel. The free blow mandrel is inserted through the mouth of the individual blow mold cavity which is located on the side of the blow molding tool arrangement facing away from the extrusion nozzle. The output of the extrusion nozzle and the axial extension of the free blow mandrel are arranged such that they are essentially axially flush.

In the continuous extrusion blow molding process, the plastic tubing is continuously extruded from the extrusion nozzle of the extruder head. After transfer of the extruded plastic tubing to the multipart mold cavity of the blow molding tool arrangement and during the entire blowing process, the relative distance of the extruder head from the blow molding tool arrangement is increased so that it does not run against the surface of the blow molding tool arrangement during further extrusion and the tubing can be held in controlled alignment. This takes into account the circumstance that plastic tubing is continuously extruded from the extrusion nozzle while the inflation process in the blow mold cavities of the blow molding tool arrangement is a discontinuous process.

The relative change in the distance between the extruder head and the blow molding tool arrangement takes place at least at a rate which corresponds to the rate of emergence of the plastic tubing from the extrusion nozzle. This ensures that the extruded tube does not run onto the surface of the blow molding tool arrangement. When a rate of change of the distance which is higher than the extrusion rate is selected, the plastic tubing which is clamped in regions in the blow molding tool arrangement is more or less pulled out of the nozzle tool. In this way for example the wall thickness of the extruded plastic tubing can be specifically changed. Thus a thin-walled tube can be produced with a relatively large nozzle gap. On the one hand, this has the advantage that in spite of a high throughput the pressure in the extruder head can be kept relatively low, and on the other hand the dissipation and thus the temperature rise in the tubing becomes less. Another advantage is that even when processing highly swelling materials a thin-walled tube can be produced, since based on the larger nozzle gap and the associated lower shear the danger of a melt break is reduced. It can also be provided that the relative speeds between the extruder head and the free blow mandrel or the blow mold during continuous tubing emergence can be continuously changed according to a stretching program in order to influence the tubing wall thicknesses to the desired extent.

To achieve the change in distance between the extruder head and the blow molding tool arrangement it is possible to move the extruder head or the blow molding tool arrangement away or to carry out a combination of movements. Movement of only one of the two equipment parts simplifies the mechanical structure and the control of the movements. For mechanical reasons it is advantageous if the change in distance takes place solely by moving the extruder head away relative to the blow molding tool arrangement which is stationary with respect to its position. On the one hand, in the region of the extruder head there is more room for attaching the lifting means. On the other hand, it is advantageous for the feed of the axial blow mandrel if the blow molding tool arrangement during the entire blowing cycle retains its position essentially unchanged. The blow molding tool arrangement need execute only one opening and closing motion for acceptance of the tubing section in the blow mold cavities. These processes are simpler and can be more exactly controlled when the blow molding tool arrangement does not execute any further motion.

In a discontinuous blowing process the plastic tubing is discontinuously ejected from the extrusion nozzle of an extruder head which is made as baffle head into the mold cavity of the blow molding tool arrangement. During ejection of the plastic tubing the distance axial of the blow mandrel from the baffle head is increased. The structure of the extrusion blow molding machine for the discontinuous process corresponds largely to that of continuous machines. In contrast to the known discontinuous process however the tubing is permanently held and guided in a controlled manner during the production process. In this way uncontrolled oscillation of the tubing is prevented. Moreover the holding of the tubing if necessary can also be used for controlled stretching or changing its location. In the discontinuous process the tubing must be prevented from running onto the surface of the blow molding tool arrangement. To do this the rate of change of the distance of the free blow mandrel from the baffle head is set to be greater than or equal to the ejection rate of the plastic tubing from the extrusion nozzle.

The process as claimed in the invention in which the plastic tubing is guided in a controlled manner during the entire production cycle allows process control with almost any direction of motion of the plastic tubing. While known processes are limited essentially to a vertical extrusion direction of the plastic tubing, the guidance of the tubing also allows an oblique, even horizontal alignment. For reasons of compatibility with existing machines however an axial alignment is preferred. An axially aligned arrangement of the extruder head, the blow molding tool arrangement and the free blow mandrel allows relatively simple control of the axial components of motion. Advantageously the exit speed of the plastic tubing, the extruder head motion, the adjustment motion of the width of the extrusion nozzle, the blow mandrel motion and the opening and closing motion of the blow molding tool arrangement can be set individually and matched to one another. This allows implementation of optimized movement sequences which are matched to the requirements of the container to be blown, without in this way having to undertake changes in the overall concept of the process as claimed in the invention. For example, it can be provided that the plastic tubing is inclined during one production cycle in order to be able to optimally use special geometries of blow mold cavities and to produce special container geometries.

In one advantageous version of the invention the blow molding tool arrangement comprises at least two mold parts which can be separated from one another and which can be moved for opening and closing of the blow molding tool essentially perpendicular to the extrusion direction from the open end position into the closed end position and vice versa. For a blow molding tool arrangement fixed in its position the positioning means for the opening and closing process can likewise be stationary. Abandoning an additional component of motion simplifies the mechanical structure and also contributes to reducing the control effort for controlled movements of mold parts.

The advantages of the process were explained using the example of an extruder head with only one extrusion nozzle and a blow molding tool arrangement with only one mold cavity composed of several blow mold cavities arranged in succession. The blow molding tool arrangement can be for example also an arrangement of tools with several mold cavities which each have a number of blow mold cavities located axially under one another. In one advantageous process version, an extruder head with a multiple extrusion nozzle tool and a blow molding tool arrangement which is equipped with a corresponding number of mold cavities are used. In this way, in one blowing cycle with uniform machine and tool parameters a larger number of plastic containers, for example plastic bottles, can be produced. In this way the throughput is increased and the productivity of a multiple blow molding tool arrangement can be further improved.

One advantageous process version calls for at least one ejector which can be extended laterally relative to the inside wall of the mold to act on the inflated plastic container for removal from the mold. The ejector is fed onto the finish-blown containers such that they are touched by the ejector in the region of the mutually adjoining mouths of the pairs of blow mold cavities which are arranged mirror symmetrically. This has the advantages that pressure points of the ejector occur in the lost region which is separated from the two containers which are connected by the mouths. Therefore impressions from the ejectors reliably do not appear on the finished containers.

The extrusion blow molding machine made as claimed in the invention for producing plastic containers, especially plastic bottles, has an extruder head located in an equipment frame with at least one extrusion nozzle, a blow molding tool arrangement with at least one mold cavity, and with at least one blow mandrel. The mold cavity has several blow mold cavities arranged axially under one another, two of the blow mold cavities at a time being arranged mirror symmetrically to one another and connected on their mouth regions, and an individual blow mold cavity is separated by a land region from the bottom section of the adjacent blow mold cavity and has a mouth on the outer surface of the blow molding tool arrangement. The extrusion blow molding machine has a number of guided blow mandrels which corresponds to the number of pairs of blow mold cavities arranged mirror-symmetrically to one another. The guided blow mandrels can be moved laterally in holes of the blow molding tool arrangement and can each be inserted into the two connected blow mold cavities in the area of the mutually bordering mouths in order to inflate the sections of the extruded plastic tubing which have been inserted there according to the blow mold cavities. In addition there is another, free blow mandrel which can be inserted axially into the mouth of the individual blow mold cavity in order to inflate the section of the plastic tubing located there.

The extrusion blow molding machine as claimed in the invention combines the construction principles of systems with guided blow mandrels which can moved within the blow molding tool arrangement and systems with a free blow mandrel which can be fed axially. Both principles have been tried and proven. The extrusion blow molding machine as claimed in the invention thus allows a much greater ejection of plastic containers blown per unit of time at comparatively little additional mechanical effort.

For reasons of design and due to the relatively low additional cost, an extrusion blow molding machine is advantageous with a blow molding tool arrangement which has a mold cavity with three blow mold cavities arranged axially under one another.

Advantageously the blow molding tool arrangement has at least one ejector which can be extended for removal of the inflated plastic container from the mold laterally relative to the internal mold wall. The ejector is arranged such that upon ejection it touches the container in the region of the mutually adjoining mouths of the pairs of blow mold cavities arranged mirror symmetrically. Preferably there are two ejectors which are arranged opposite one another in one of the mold halves of the blow molding tool arrangement. The arrangement of the ejector or ejectors has the advantage that pressure points occur only in a lost region which is separated from the two containers which are connected by the mouths. Certainly no impressions of the ejectors can be detected on the finished containers.

One version of the extrusion blowing molding device on the opposite sides of the blow molding tool arrangement has holding means for the plastic tubing. By providing holding means on either side of the blow molding tool arrangement the plastic tubing during the entire production cycle of a container is continuously held and guided. Mispositioning of the plastic tubing can thus be avoided. If it seems necessary, the location of the tubing however can also be changed specifically relative to the extrusion direction. In this way for example the requirements of more complicated container geometries can be taken into account. The sections of the plastic tubing located in the blow mold cavities are inflated immediately after feed with the extruded plastic tubing. The plastic tubing is fixed during the entire production cycle in a defined position and can no longer oscillate around its axis. The extruder head and the blow molding tool arrangement during the entire extrusion and blowing process remain essentially in a definable and adjustable geometrical positional relationship, and the plastic tubing can be optimally accepted. In this way for more complicated geometries of the blow mold cavity the danger of unintentional sticking of the plastic tubing is reduced.

The holding devices for the tubing are formed on the one hand by the free blow mandrel and on the other by the extruder head. By using existing machine components for the holding function, the structure can be kept simple and the construction can be kept compact.

In an arrangement which is also advantageous for reasons of space, the blow molding tool arrangement is located between the extruder head and the free blow mandrel. The individual blow mold cavity has a mouth on the side of the blow molding tool arrangement facing away from the extrusion nozzle into which the free blow mandrel can be inserted. In this arrangement the adjustment and feed movements of the equipment components are limited essentially to movements along the direction of motion of the plastic tubing and essentially perpendicularly thereto. This leads to lower mechanical stresses and reduces the vibration and shaking which occur in operation.

To prevent the plastic tubing from running onto equipment components or sagging during the extrusion and blowing cycles, there are positioning means with which the relative distance between the extruder head and the blow molding tool arrangement can be adjusted. One advantageous version calls for the extruder head to be connected to the positioning means and to be adjustable in distance relative to the stationary blow molding tool arrangement. This arrangement has the advantage that on the blow molding tool arrangement there need be essentially only precautions for opening and closing the mold parts and for feed of the internally guided blow mandrel and the ejector. This simplifies the movement sequences and control effort.

The extruder head can be made for continuous extrusion of the plastic tubing. In this version the change in the distance between the extruder head and blow molding tool arrangement takes place at least with the extrusion rate of the plastic tubing. In one alternative version of the invention the extruder head is made as a baffle head for discontinuous ejection of the plastic tubing. In this version the free blow mandrel is adjustable in distance relative to the blow molding tool arrangement at least with the ejection speed of the plastic tubing.

Since there are holding means for the plastic tubing on both sides of the blow molding tool arrangement, the alignment of the extrusion nozzle, the blow molding tool arrangement and the free blow mandrel can be selected at will. For reasons of compatibility with existing devices and system components however an arrangement is preferred in which the extruder head has an essentially vertically aligned extrusion nozzle and the blow molding tool arrangement and the free blow mandrel are arranged vertically under one another. The vertical arrangement also uses the action of gravity which is stabilizing to a certain extent on the extruded plastic tubing.

The blow molding tool arrangement comprises at least two mold parts which can be separated from one another and which can be moved for opening and closing essentially perpendicular to the extrusion direction of the plastic tubing out of an open end position into a closed end position and vice versa. In a blow molding tool arrangement which is fixed with respect to its position, the positioning means can be therefore stationary for the opening and closing process. Abandoning an additional component of motion simplifies the mechanical structure and also contributes to reducing the control effort for controlled movements of the mold parts.

For reasons of higher throughput it is advantageous if the extruder head has several extrusion nozzles and the blow molding tool arrangement with a corresponding number of mold cavities is equipped with a number of blow mold cavities which are arranged under one another. Aside from the higher throughput and improved productivity of the multiple blow molding tool, in this version in one blowing cycle a larger number of plastic containers, for example plastic bottles, can be produced with machine and tool parameters remaining the same. This has advantages with respect to the uniformity of the quality of the products produced.

The invention is detailed below with reference to the schematics which are not to scale.

FIG. 12 shows a blow molding tool arrangement made as claimed in the invention with three blow mold cavities located axially under one another in the opened state;

FIG. 13 shows the blow molding tool arrangement as shown in FIG. 12 with the indicated ejectors; and FIG. 14 shows a cross section of the blow molding tool arrangement according to cutting line A-A in FIG. 13.

Figure 1:
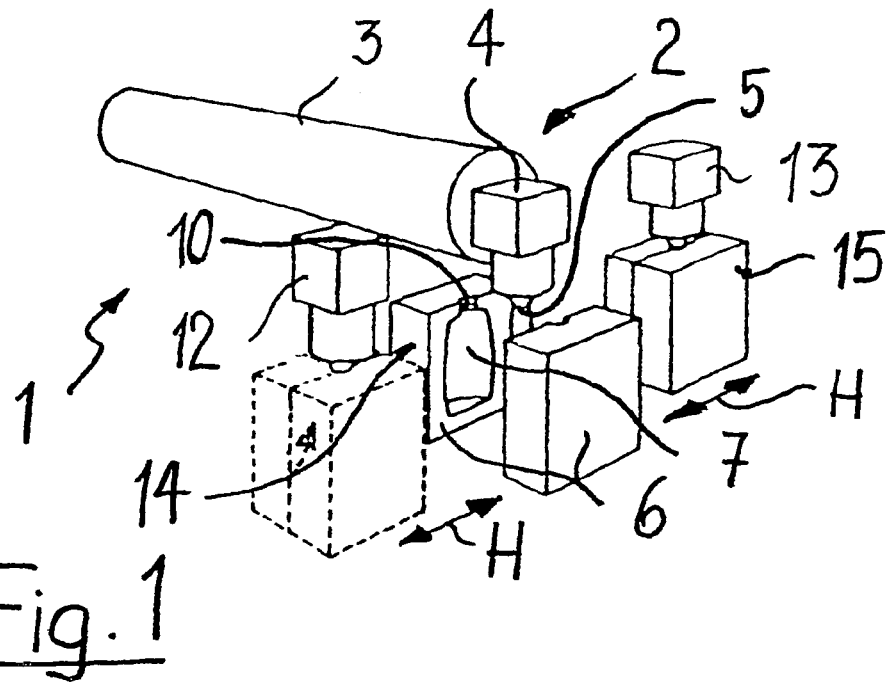
FIG. 1 shows a schematic of an extrusion blow molding machine of the prior art.

The extrusion blow molding machine shown schematically in FIG. 1 is labelled with reference number 1 altogether. The structure of these long stroke extrusion blow molding machines is well known and is described for example in *Blow Molding Handbook*, edited by Donald V. Rosato and Dominick V. Rosato, 1989, ISBN 1-56990-089-2, Library of Congress Catalog Card Number 88-016270. The representation in FIG. 1 is limited therefore to the components of the extrusion blow molding machine 1 which are absolutely necessary for understanding. The illustrated embodiment is a two-station blow molding machine as is also offered by the applicant. It has an extrusion unit 2 and two blowing stations 12, 13. The extrusion unit 2 comprises an extruder 3 for plastic granulate and an extruder head 4 which is connected to it and which has at least one extrusion nozzle 5. The blowing stations 12, 13 each have an extruder head with a blow mandrel. Each blowing station 12, 13 is equipped with a blow molding table 14, 15 in which the blow molding tools 6 are mounted. The blow molding tools 6 each encompass a mold cavity 7 which forms the blow mold cavity for the hollow body to be produced, for example a bottle. The blow mold cavities 7 on their top facing the extruder head 4 have a mouth 10. The blow molding tables 14, 15 can be moved alternately out of their lateral end positions in the blowing stations 12, 13 into a position in which the mouth of the blow molding tool 6 is axially flush with the output of the extrusion nozzle 5. The lateral displacement of the blow molding tables 14, 15 takes place essentially perpendicular to the lengthwise extension of the extruder 3.

The plastic granulate supplied via the extruder 3 is melted in the extruder 3 and/or in the extruder head 4 and is extruded from the extrusion nozzle 5 as continuous tubing. The tubing can be extruded in one or more layers. For this purpose there can also be other extruders which transport the required different plastic materials to the extruder head 4. The blow molding tables 14, 15 with the blow molding tools 6 are moved alternately out of their end positions in the blowing stations 12, 13 laterally to under the extruder head 4, the blow molding tools 6 are opened, and a piece of the extruded tubing is collected. Afterwards the respective blow molding table 14, 15 is returned again to its end position in the blowing station 12 and 13. There, using a blow mandrel which has been inserted into the cavity 7 through the mouth 8, the hollow body is inflated. The finished hollow body is ejected and the cycle repeated. While one tube is inflated in one blow molding station 12, the blow molding table 15 of the second blowing station 13 is moved laterally to under the extruder head 4, in order to collect another piece of the extruded tube. In this way continuous operation is enabled.

Figure 2:
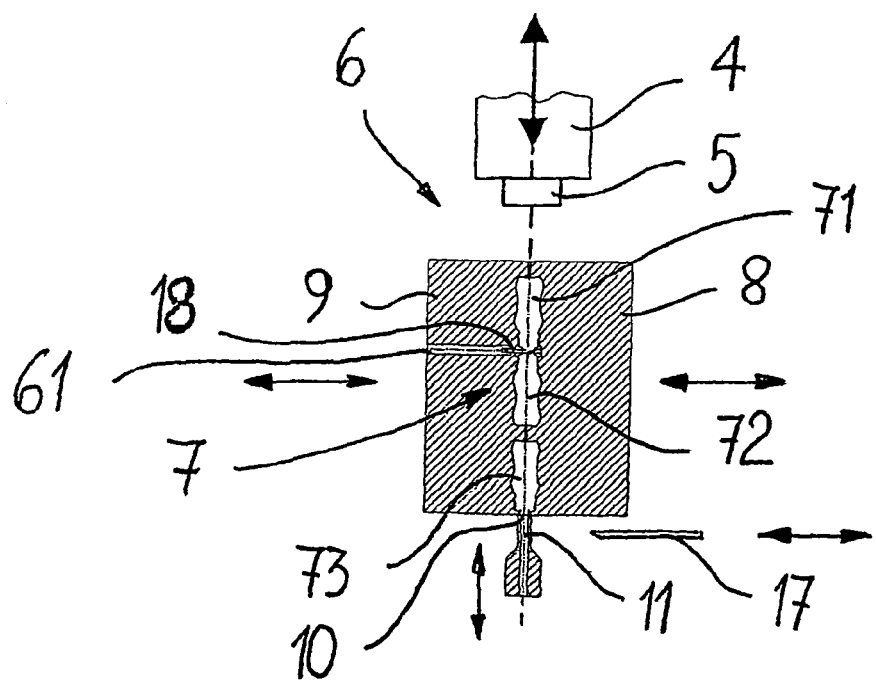
FIG. 2 shows a diagram of an arrangement of an extruder head, a molding tool and a blow mandrel as claimed in the invention.

FIG. 2 schematically shows an arrangement of the hardware components which are important to the invention. In this connection the designations from FIG. 1 were retained to enable direct comparison of systems. Reference number 4 labels in turn the extruder head which has the extrusion nozzle 5. Reference number 6 stands for the blow molding tool arrangement of the extrusion blow molding device which in the illustrated embodiment comprises two blow mold halves 8, 9. The two blow mold halves 8, 9 border the mold cavity 7 which as claimed in the invention consists of several blow mold cavities 71, 72, 73 which are located axially under one another. In this connection, two of the total of three blow mold cavities 71, 72 according to the illustrated embodiment are arranged mirror symmetrically to one another such that their mouths border one another. A third, individual blow mold cavity 73 is separated by a land region from the bottom of the preceding blow mold cavity 72 and has a mouth 10 on the side of the blow molding tool arrangement 6 facing away from the extruder nozzle 5. Proceeding from the practical arrangement of the hardware components, the mouth 10 of the individual blow mold cavity 73 is located on the bottom of the blow molding tool arrangement 6. A so-called free blow mandrel labelled with reference number 11 can be inserted into the mouth 10 of the individual blow mold cavity. The blow molding tool arrangement 6 has a hole 61 in which a guided blow mandrel 18 can be moved laterally. The blow mandrel 18 which can be moved laterally is arranged such that it can be fed exactly in the region of the mutually adjoining mouths of the mirror-symmetrical blow mold cavity pair 71, 72.

The extruder head 4 and the blow molding tool arrangement 6 are arranged such that the axis of the blow mold cavity 7 and the output of the extrusion nozzle 5 on the extruder head 4 are axially flush with one another. In the illustrated embodiment the free blow mandrel 11 is arranged such that it is flush with the axis of the mold cavity 7 which is made in three parts. This is however not a critical requirement. It goes without saying that for an eccentrically arranged mouth of the individual blow mold cavity 73 the free blow mandrel 11 can also be laterally offset accordingly. Reference number 17 labels a blade which is used to cut the finish-blown hollow body arrangement off the extruded tubing.

The arrows shown in FIG. 2 indicate the adjustability of the individual hardware components. Thus the extruder head 4 can essentially only be adjusted with respect to its height in order to change the distance to the blow molding tool arrangement 6 during the extrusion and blowing process. For the required basic setting and fine adjustment however it has all degrees of freedom. The blow mold halves 8, 9 of the blow molding tool arrangement 6 can only be moved laterally from an open end position into a closed end position and vice versa. In one version of the invention there can also be vertical adjustability for the blow molding tool arrangement 6. The blow mandrel 18 which is guided in the hole 61 is located at the height of the mouth region of the mirror symmetrical blow mold cavity pair 71, 72. The free blow mandrel 6 is vertically adjustable in order to be able to be inserted into the mouth 10 of the individual blow mold cavity 73 and withdrawn again.

The blow molding tool arrangement shown in FIG. 2 with several, especially three blow mold cavities which are located axially under one another can for example also be provided in the extrusion blow molding device as shown in FIG. 1. In this case the third, individual blow mold cavity could also have its mouth on the top of the blow molding tool arrangement. The free blow mandrel intended for the third blow mold cavity is then fed from overhead to the mouth of the third blow mold cavity. The guided blow mandrel which can be laterally fed within a hole of the blow molding tool arrangement at the height of the mouth region of the paired blow mold cavities acts on the two blow mold cavities which are connected by their mouths.

FIGS. 3 to 11 will be used to explain the process of production of a plastic hollow body in an axially aligned arrangement.

Figure 3:
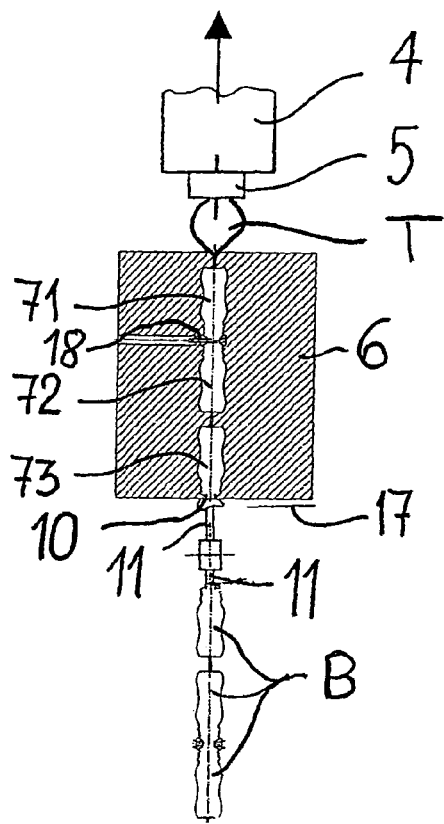
FIGS. 3-11 show schematics in explanation of the production process with a blow molding tool axially aligned to the extruder nozzle and the blow mandrel assigned to the individual blow mold cavity.

FIG. 3 shows the production cycle beginning with the state in which the blow molding tool arrangement 6 is closed. The tube T which is continuously extruded from the extrusion nozzle 5 of the extruder head 4 is labelled T. Two so-called free blow mandrels 11 are mounted on a rotary blow mandrel holding device 16 and can be inserted alternately into the mouth 10 of the individual blow mold cavity 73. Reference number 17 stands for the blade which is inactive in this state. In the state shown in FIG. 3 the tube sections which are located in the blow mold cavities 71, 72 and 73 are inflated. The tube sections which are located in the two mirror-symmetrical blow mold cavities 71, 72 are jointly inflated by the laterally adjustable blow mandrel 18.

While FIG. 3 shows a blow molding tool arrangement 6 with three blow mold cavities 71, 72, 73 which are arranged under other another, the simplified schematics in FIGS. 4 to 11 show the blow molding tool arrangement 6 with only one individual blow mold cavity. In particular here the blow mold cavity 73 of the blow molding tool arrangement 6 from FIG. 2 is shown which is representative for the arrangement of three or more blow mold cavities which comprise the entire mold cavity. The number of paired mirror-symmetrical blow mold cavities is not critical for the progression of the extrusion and blowing process described below. But it goes without saying that the mold cavity of the blow molding tool arrangement 6 also always has at least two mirror-symmetrically arranged blow mold cavities 71, 72 which as shown in FIG. 2 are connected to the individual blow mold cavity 73 to the top and which are acted upon by the guided blow mandrel which can be moved laterally in the hole of the blow molding tool arrangement.

Figure 4:
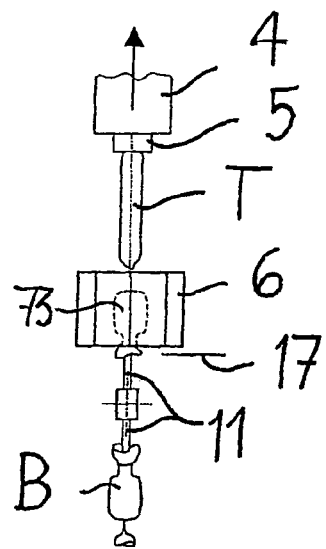

During the blowing process the extruder head 4 is continuously raised and the vertical distance to the blow molding tool arrangement 6 is continuously increased. This is indicated in FIG. 4 by the lengthening of the extruded tubing T. If the extruder head is raised at a rate which is greater than the extrusion rate of the plastic tubing, the tube is pulled out of the extrusion nozzle and stretched and its wall thickness is reduced. During raising of the extruder head 4, if necessary a wall thickness control program can be run, in which by variation of the gap width of the extrusion nozzle the wall thickness of the tubing can be changed to the desired extent. During raising of the extruder head, a support air program can also be run. The connected bottle B which has been finish-blown according to the blow mold cavities hangs on the second free blow mandrel 11 located outside the individual blow mold cavity 73 (FIG. 3). In this position they can be subjected for example to an aftercooling process which is not detailed or to other afterworking. The connected bottles are always symbolized by an individual bottle in the following.

Figure 5:
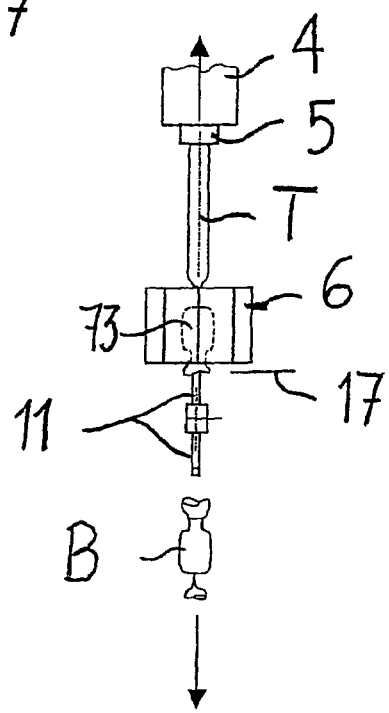
Figure 6:
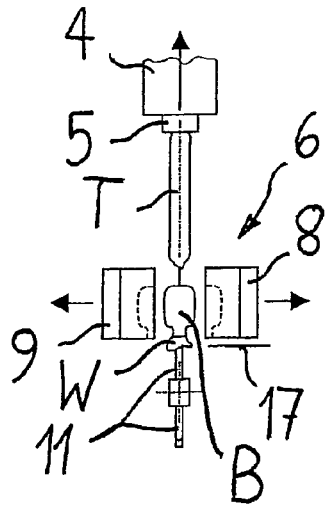
Figure 7:
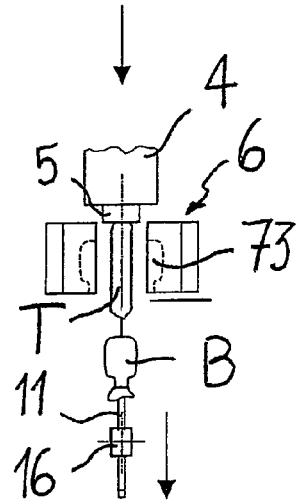

The end of the blowing process is indicated in FIG. 5. The extruder head 4 is moved farther away from the blow molding tool arrangement 6 and continues to be raised. The inflated bottles located in the individual blow mold cavity 73 and the mirror-symmetrical inflated bottles are vented by the blow molding tool arrangement 6. The bottles B hanging on the lower free blow mandrel 11 are removed. After this process the blow mold halves 8, 9 of the blow molding tool arrangement 6 are opened; this is indicated in FIG. 6. The extruder head 4 is continues to be raised. After the bottles B which have been inflated in the blow mold cavities have been completely removed from the mold cavity, the movement of the extruder head 4 is stopped and reversed. As is shown in FIG. 7, the extruder head 4 with the extruded tube piece T and the finish-blown bottles B still connected to it are moved down in the direction of the blow molding tool arrangement 6. The free blow mandrel 11 mounted on the blow mandrel holding device 16 is likewise lowered.

FIGS. 6 and 7 clearly show that the extruded tube T is kept in a position which is aligned in an axially defined manner when the blow molding tool arrangement 6 is opened. Because the tubing is still connected to the finish-blown containers B, the tubing is fixed on the one hand by the extrusion nozzle 6 and on the other via the free blow mandrel 11. In this way oscillation of the tubing T is reliably prevented. The lowering rate of the extrusion head 4 and of the free blow mandrel 11 advantageously proceeds synchronously and corresponds at least to the extrusion rate of the tubing T. The continuously extruded tubing T can be stretched to the desired degree by a definable difference of lowering rates. The axially aligned arrangement of the extruder head 4, the blow molding tool arrangement 6 and the free blow mandrel 11 also allows relatively simple control of the axial components of motion. Advantageously the exit speed of the plastic tubing T, the motion of the free blow mandrel 11 and the adjustment motion of the width of the extrusion nozzle 5 can be set individually and matched to one another. This allows implementation of optimized motion sequences which are matched to the requirements of the containers B to be blown, without in this way having to undertake changes on the overall concept of axially aligned travel.

Figure 8:
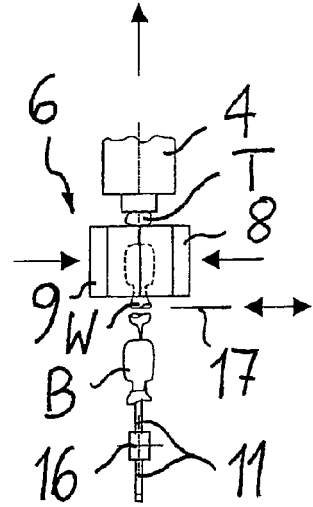
Figure 9:
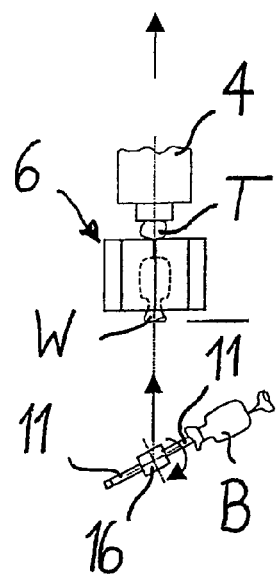
Figure 10:
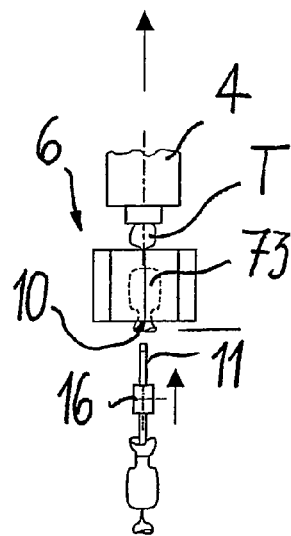
Figure 11:
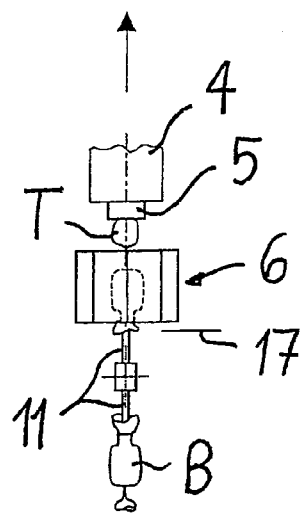

FIG. 8 shows the state in which the blow mandrel holding device 16 has reached its lowest position. At this point, the halves of the blow molding tool arrangement 6 are closed again in order to enclose a new tube section in the blow mold cavities which are located under one another. Shortly before the blow molding tool arrangement 6 is completely closed, the blade 17 is fed laterally in order to detach the finish-blown bottles B from the piece of scrap projecting from the mouth of the individual blow mold cavity. This is indicated in FIG. 8 by a double arrow. The extruder head 4 in the meantime has its direction of motion reversed again and it is raised again. After detachment, the blow mandrel holding device 16 is turned in order to align the second free blow mandrel 11 to the mouth of the individual blow mold cavity. During turning of the blow mandrel holding device 16 it can be fed to the blow molding tool arrangement 6. Rotation and vertical adjustment of the blow mandrel holding device 16 are indicated in FIG. 9 by the corresponding arrows. During this process the extruder head 4 continues to be raised. FIG. 10 shows the state in which the process of rotation of the blow mandrel holding device 16 is closed and the free blow mandrel 11 has reached its correct stroke position. Afterwards it is inserted into the mouth 10 of the blow mold cavity 7. In this connection, later opening of the bottle to be inflated is calibrated. During insertion of the free blow mandrel 11 into the individual blow mold cavity 73, preblowing can be begun. The extruder head 4 is further raised. In FIG. 11 the free blow mandrel 11 is finally inserted into the individual blow mold cavity of the blow molding tool arrangement 6 and the production cycle restarted is from the beginning. The representation in FIG. 11 corresponds to the representation in FIG. 3.

FIG. 12 shows an enlargement of the blow molding tool arrangement 6. It consists of two mold halves 8, 9 which encompass a mold cavity 7. The mold cavity 7 is composed of three blow mold cavities 71, 72, 73 which are arranged axially under one another according to the illustrated embodiment. The blow mold cavities 71, 72 which are the two upper ones in the figure are arranged mirror-symmetrically to one another and are connected by their mouth regions. The third individual blow mold cavity 73 is separated by a land region from the bottom of the preceding blow mold cavity 72. It has its mouth 10 on the bottom of the blow molding tool arrangement 6. A tubing section which is located in the individual blow mold cavity 73 is inflated via a free blow mandrel 11 which can be inserted into the mouth 10 of the individual blow mold cavity 73. The tubing sections in the two blow mold cavities 71, 72 which are connected by their mouths are inflated via a guided blow mandrel 18 which can be moved laterally in a hole 61 of the blow molding tool arrangement 6. The guided blow mandrel 18 is arranged such that it passes through the plastic tubing in the region of the mouths which border one another. FIG. 12 shows the mold halves 8, 9 in the opened state. The three finish-blown bottles B are shown detached from the inside walls of the mold and are held securely on the free blow mandrel 11. The finish-blown plastic bottles are later detached at the land site between the bottoms of the two lower bottles and in the area of the adjoining mouths of the two upper bottles. In this connection a middle piece is detached in the region of the adjoining mouths. The blow molding tool arrangement 6 which is shown schematically by way of example has a mold cavity 7 which is composed of three blow mold cavities 71, 72, 73. It goes without saying that the mold cavity can also be composed of more than three blow mold cavities. In addition, the sequence of blow mold cavities which are provided in pairs and individually can be changed and the individual blow mold cavity can have its mouth on the top of the blow molding tool arrangement.

FIGS. 13 and 14 show that the blow molding tool arrangement 6 has ejectors 19, 20 which can be extended relative to the inside wall when the mold halves 8, 9 are opened and which facilitate removal of the finish-blown bottles. The ejectors 19, 20 are guided in holes 62, 63 in the mold halves 8, 9 and can be hydraulically actuated, for example. The arrangement of the ejectors 19, 20 is such that they touch the finish-blown bottles only in the middle region of the abutting mouths of the mirror-symmetrical blow mold cavities 71, 72. The middle region between the abutting mouths is later detached. In this way no pressure marks from the ejectors are visible on the finish-blown bottles with certainty.

The invention was shown in the schematics using the example of an extruder head with only one extrusion nozzle and one blow molding tool arrangement with only one mold cavity. It goes without saying that the illustrated arrangement and the illustrated process can also be used for extrusion blowing devices with multiple nozzle tools and multiple blow molding tools or arrangements of single and/or multiple blow molding tools. The number of blow mandrels is matched in this connected to the number of blow mold cavities.

The invention has been explained using the example of a continuous extrusion blowing process and a correspondingly made device with a vertical arrangement of the extruder head, the blow molding tool arrangement and the blow mandrels. It goes without saying that the hardware components can also be arranged in a horizontal or any alignment according to the extrusion direction. The process as claimed in the invention can also be used in a discontinuous extrusion blowing process and accordingly a discontinuous extrusion blowing machine can also be produced.

The invention claimed is:

1. Process for producing plastic containers, in an extrusion blow molding process, in which plastic tubing (T) which has been extruded from an extruder head in a definable cycle is placed in the mold cavity of a blow molding tool arrangement, the inserted plastic tubing is inflated via an infeed blow mandrel by overpressure according to the mold cavity and is then removed from the mold, wherein the extruded plastic tubing (T) is inserted into a mold cavity which is composed of several blow mold cavities, at least two of the blow mold cavities being located axially under one another and being arranged mirror-symmetrically to one another and connected on their mouth regions and an individual blow mold cavity being separated from the bottom section of the adjacent blow mold cavity by a land region and having a mouth on the outer surface of the blow molding tool arrangement, there is a number of guided blow mandrels corresponding to the number of pairs of blow mold cavities located mirror symmetrically to one another, which mandrels can be moved laterally in the holes of the blow molding tool arrangement and are each inserted into the two connected blow mold cavities in the region of the mouths which border one another, in order to inflate the sections of the extruded plastic tubing (T) which have been inserted there according to the blow mold cavities, while another free blow mandrel is inserted axially into the mouth of the individual blow mold cavity in order to inflate the section of the plastic tubing located there, and the containers (B) which have been inflated according to the blow mold cavities are removed from the mold.

2. Process as claimed in claim 1, wherein the extruded plastic tube (T) is inserted into a mold cavity which is equipped with three blow mold cavities located axially under one another.

3. Process as claimed in claim 2, wherein the plastic tubing (T) is held continuously on opposing sides of the blow molding tool arrangement during an entire extrusion and blowing cycle.

4. Process as claimed in claim 3, wherein the plastic tubing (T) after inflation of the hollow body (B) is detached on the side of the blow molding tool arrangement which faces away from the extruder head.

5. Process as claimed in claim 4, wherein the blow molding tool arrangement relative to the direction of motion of the plastic tubing (T) is located between the extruder head and the free blow mandrel which can be inserted into the mouth of the individual blow mold cavity which is located on the side of the blow molding tool arrangement facing away from the extrusion nozzle for inflating the plastic tubing (T).

6. Process as claimed in claim 5, wherein the plastic tubing is continuously extruded and after transfer of the extruded plastic tubing (T) to the blow mold cavities and during the blowing process, the relative distance between the extruder head and the blow molding tool arrangement is increased.

7. Process as claimed in claim 6, wherein the distance is changed by moving the extruder head away from the blow molding tool arrangement which is essentially stationary with respect to its position.

8. Process as claimed in claim 7, wherein the change in distance takes place at a rate which is greater than or equal to the rate of emergence of the plastic tubing (T) from the extrusion nozzle of the extruder head.

9. Process as claimed in claim 5, wherein the extruder head is made as a baffle head with an extrusion nozzle with which the plastic tubing is discontinuously ejected into the blow mold cavity of the blow molding tool arrangement, and wherein during ejection of the plastic tubing the relative distance of the blow mandrel from the baffle head is increased.

10. Process as claimed in claim 9, wherein the rate of change of the distance of the blow mandrel from the baffle head is greater than or equal to the ejection rate of the plastic tubing from the extrusion nozzle.

11. Process as claimed in claim 10, wherein the blow molding tool arrangement comprises at least two tool parts which can be separated from one another and which can be moved for opening and closing of the blow molding tool arrangement essentially perpendicular to the extrusion direction of the plastic tubing (T) from the open end position into the closed end position and vice versa.

12. Process as claimed in claim 11, wherein an extruder head with a multiple extrusion nozzle tool is used and a blow molding tool arrangement is used which is equipped with a corresponding number of mold cavities which are each composed of several blow mold cavities which are arranged axially underneath one another.

13. Process as claimed in claim 12, wherein for purposes of removal from the mold at least one ejector which can be extended laterally relative to the inside wall of the mold acts on the inflated plastic containers (B), the containers (B) being touched by the ejector in the region of the mutually bordering mouths of the mirror-symmetrically arranged pairs of blow mold cavities.

14. Process as claimed in claim 1, wherein the plastic tubing (T) is held continuously on opposing sides of the blow molding tool arrangement during an entire extrusion and blowing cycle.

15. Process as claimed in claim 3, wherein the blow molding tool arrangement relative to the direction of motion of the plastic tubing (T) is located between the extruder head and the free blow mandrel which can be inserted into the mouth of the individual blow mold cavity which is located on the side of the blow molding tool arrangement facing away from the extrusion nozzle for inflating the plastic tubing (T).

16. Process as claimed in claim 1, wherein the plastic tubing is continuously extruded and after transfer of the extruded plastic tubing (T) to the blow mold cavities and during the blowing process, the relative distance between the extruder head and the blow molding tool arrangement is increased.

17. Process as claimed in claim 6, wherein the change in distance takes place at a rate which is greater than or equal to the rate of emergence of the plastic tubing (T) from the extrusion nozzle of the extruder head.

18. Process as claimed in claim 1, wherein the extruder head is made as a baffle head with an extrusion nozzle with which the plastic tubing is discontinuously ejected into the blow mold cavity of the blow molding tool arrangement, and wherein during ejection of the plastic tubing the relative distance of the blow mandrel from the baffle head is increased.

19. Process as claimed in claim 1, wherein the blow molding tool arrangement comprises at least two tool parts which can be separated from one another and which can be moved for opening and closing of the blow molding tool arrangement essentially perpendicular to the extrusion direction of the plastic tubing (T) from the open end position into the closed end position and vice versa.

20. Process as claimed in claim 1, wherein an extruder head with a multiple extrusion nozzle tool is used and a blow molding tool arrangement is used which is equipped with a corresponding number of mold cavities which are each composed of several blow mold cavities which are arranged axially underneath one another.

21. Process as claimed in claim 1, wherein for purposes of removal from the mold at least one ejector which can be extended laterally relative to the inside wall of the mold acts on the inflated plastic containers (B), the containers (B) being touched by the ejector in the region of the mutually bordering mouths of the mirror-symmetrically arranged pairs of blow mold cavities.

22. The process for producing plastic containers according to claim 1, wherein the process is used to produce plastic bottles.

23. Extrusion blow molding machine for producing plastic containers, with an extruder head which is located in an equipment frame with an extrusion nozzle, a blow molding tool arrangement with a mold cavity, and with at least one blow mandrel, wherein the mold cavity has several blow mold cavities at least two of the blow mold cavities at a time being located axially under one another and being arranged mirror-symmetrically to one another and being connected on their mouth regions, and an individual blow mold cavity being separated by a land region from the bottom section of the adjacent blow mold cavity and having a mouth on the outer surface of the blow molding tool arrangement, there being a number of guided blow mandrels which corresponds to the number of pairs of blow mold cavities arranged mirror-symmetrically to one another and the guided blow mandrels being laterally movable in holes of the blow mold arrangement and each being insertable into the two connected blow mold cavities in the area of the mutually bordering mouths in order to inflate the sections of the extruded plastic tubing (T) which have been inserted there according to the blow mold cavities and there being another, free blow mandrel which can be inserted axially into the mouth of the individual blow mold cavity in order to inflate the section of the plastic tubing (T) located there.

24. Extrusion blow molding machine as claimed in claim 23, wherein the mold cavity has three blow mold cavities which are arranged axially under one another.

25. Extrusion blow molding machine as claimed in claim 24, wherein the blow molding tool arrangement has at least one ejector which can be extended for removal of the inflated plastic containers (B) from the mold laterally relative to the internal mold wall and is arranged such that upon ejection it touches the containers (B) in the region of the mutually adjoining mouths of the pairs of blow mold cavities arranged mirror-symmetrically.

26. Extrusion blow molding machine as claimed in claim 25, wherein there is an ejector in each mold half of the blow molding tool arrangement.

27. Extrusion blow molding machine as claimed in claim 26, wherein on axially opposing sides of the blow molding tool arrangement there are holding means for the extruded plastic tubing and on the side of the blow molding tool arrangement facing away from the extruder head there is a cutting means.

28. Extrusion blow molding machine as claimed in claim 27, wherein the holding means for the plastic tubing (T) are formed on the one hand by the extruder head and on the other by the free blow mandrel.

29. Extrusion blow molding machine as claimed in claim 28, wherein the blow molding tool arrangement is located between the extruder head and the free blow mandrel, and on the side of the blow molding arrangement facing away from the extrusion nozzle the individual blow mold cavity has a mouth through which the free blow mandrel can be inserted into the blow mold cavity.

30. Extrusion blow molding machine as claimed in claim 29, wherein there are positioning means with which the relative distance between the extruder head the blow molding tool arrangement can be adjusted during one production cycle.

31. Extrusion blow molding machine as claimed in claim 30, wherein the positioning means are connected to the extruder head.

32. Extrusion blow molding machine as claimed in claim 31, wherein the extruder head is made for continuous extrusion of the plastic tubing (T).

33. Extrusion blow molding machine as claimed in claim 31, wherein the extruder head is made as a baffle head for discontinuous ejection of the plastic tubing, and an axially arranged blow mandrel is adjustable in distance relative to the blow molding tool arrangement at least with the ejection speed of the plastic tubing.

34. Extrusion blow molding machine as claimed in claim 33, wherein the blow molding tool arrangement comprises at least two mold parts which can be separated from one another and which can be moved for opening and closing essentially perpendicular to the extrusion direction of the plastic tubing (T) from the open end position into the closed end position and vice versa.

35. Extrusion blow molding machine as claimed in claim 34, wherein the extruder head has several extrusion nozzles and the blow molding tool arrangement is equipped with a corresponding number of mold cavities and has several blow mold cavities which are arranged axially under one another, two of the blow mold cavities being arranged mirror-symmetrically to one another and connected on their mouth regions and an individual blow mold cavity being separated from the bottom section of the adjacent blow mold cavity by a land region and having a mouth on the outer surface of the blow molding tool arrangement.

36. Extrusion blow molding machine as claimed in claim 23, wherein the blow molding tool arrangement has at least one ejector which can be extended for removal of the inflated plastic containers (B) from the mold laterally relative to the internal mold wall and is arranged such that upon ejection it touches the containers (B) in the region of the mutually adjoining mouths of the pairs of blow mold cavities arranged mirror-symmetrically.

37. Extrusion blow molding machine as claimed in claim 23, wherein on axially opposing sides of the blow molding tool arrangement there are holding means for the extruded plastic tubing and on the side of the blow molding tool arrangement facing away from the extruder head there is a cutting means.

38. Extrusion blow molding machine as claimed in claim 23, wherein there are positioning means with which the relative distance between the extruder head the blow molding tool arrangement can be adjusted during one production cycle.

39. Extrusion blow molding machine as claimed in claim 23, wherein the extruder head is made for continuous extrusion of the plastic tubing (T).

40. Extrusion blow molding machine as claimed in claim 23, wherein the extruder head is made as a baffle head for discontinuous ejection of the plastic tubing, and an axially arranged blow mandrel is adjustable in distance relative to the blow molding tool arrangement at least with the ejection speed of the plastic tubing.

41. Extrusion blow molding machine as claimed in claim 23, wherein the blow molding tool arrangement comprises at least two mold parts which can be separated from one another and which can be moved for opening and closing essentially perpendicular to the extrusion direction of the plastic tubing (T) from the open end position into the closed end position and vice versa.

42. Extrusion blow molding machine as claimed in claim 23, wherein the extruder head has several extrusion nozzles and the blow molding tool arrangement is equipped with a corresponding number of mold cavities and has several blow mold cavities which are arranged axially under one another, two of the blow mold cavities being arranged mirror-symmetrically to one another and connected on their mouth regions and an individual blow mold cavity being separated from the bottom section of the adjacent blow mold cavity by a land region and having a mouth on the outer surface of the blow molding tool arrangement.

43. The extrusion blow molding machine as claimed in claim 23, wherein the extrusion blow molding machine is used to produce plastic bottles.

* * * * *